US 6,534,152 B2

(12) United States Patent
Freeman

(10) Patent No.: US 6,534,152 B2
(45) Date of Patent: *Mar. 18, 2003

(54) WINDSHIELD FOR HEAD-UP DISPLAY SYSTEM

(75) Inventor: Glenn E. Freeman, Tarentum, PA (US)

(73) Assignee: PPG Industries Ohio, Inc., Cleveland, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 71 days.

(21) Appl. No.: 08/082,120

(22) Filed: Jun. 23, 1993

(65) Prior Publication Data

US 2001/0044010 A1 Nov. 22, 2001

Related U.S. Application Data

(62) Division of application No. 07/654,408, filed on Feb. 8, 1991, now abandoned, which is a continuation of application No. 07/414,492, filed on Sep. 28, 1989, now abandoned.

(51) Int. Cl.[7] ............................ B32B 3/00; G02B 27/14; G09G 5/00
(52) U.S. Cl. ....................... 428/172; 428/215; 428/437; 359/630; 345/7; 52/786.12
(58) Field of Search .................. 428/156, 157, 428/192, 194, 195, 207, 213, 215, 210, 220, 437, 172; 359/630; 52/786.12; 345/7

(56) References Cited

U.S. PATENT DOCUMENTS

| 2,937,407 | A | | 5/1960 | Richardson ............... 18/48 |
| 3,696,186 | A | | 10/1972 | Stark et al. .............. 264/292 |
| 3,762,988 | A | * | 10/1973 | Clock et al. .............. 428/432 |
| 3,868,286 | A | | 2/1975 | Fariss et al. .............. 156/163 |
| 3,912,440 | A | * | 10/1975 | Koss et al. ............... 425/335 |
| 3,922,456 | A | * | 11/1975 | Baldridge ................ 428/203 |
| 4,201,351 | A | | 5/1980 | Tolliver ................. 424/56 B |
| 4,302,263 | A | * | 11/1981 | Postupack ................ 427/164 |
| 4,316,868 | A | | 2/1982 | Esposito et al. ........... 264/171 |
| 4,554,713 | A | * | 11/1985 | Chabal .................. 425/366 |
| 5,013,134 | A | | 5/1991 | Smith ................... 350/174 |
| 5,087,502 | A | * | 2/1992 | Esposito et al. ........... 428/156 |
| 5,130,174 | A | * | 7/1992 | Esposito ................ 428/156 |
| 5,137,673 | A | | 8/1992 | Bourcier et al. ........... 264/151 |

FOREIGN PATENT DOCUMENTS

EP WO91/06031 5/1991

OTHER PUBLICATIONS

Defense Publication No. 739,939 published Apr. 22, 1969.

* cited by examiner

Primary Examiner—Donald J. Loney
(74) Attorney, Agent, or Firm—Andrew C. Siminerio

(57) ABSTRACT

A wedge shaped interlayer blank is used in the fabrication of a laminate e.g. a vehicle windshield to provide the subsequently formed windshield with opposing major surfaces that are non-parallel and offset at a predetermined angle such that images from a display source that are reflected off the opposing major surfaces of the windshield are substantially superimposed over each other.

13 Claims, 3 Drawing Sheets

WINDSHIELD FOR HEAD-UP DISPLAY SYSTEM

RELATED APPLICATIONS

This is a division of application Ser. No. 07/654,408, filed Feb. 8, 1991 now abandoned, which is a continuation of application Ser. No. 07/414,492, filed Sep. 28, 1989, now abandoned.

BACKGROUND OF THE INVENTION

1. Field of the Invention

This invention relates to an interlayer having a wedged configuration to eliminate double imaging for use in an automotive windshield functioning as the combiner for a head-up display system.

2. Technical Considerations

A head-up display system is a visual display arrangement that displays information to a viewer while he simultaneously views the real world around and through the display. Head-up display systems are often incorporated into aircraft cockpits for pilots to monitor flight information. More recently the systems have been used in land vehicles such as cars, trucks and the like. The display is generally positioned so that the viewer does not have to glance downward to the vehicle dashboard and away from the viewing area in front of the vehicle as is normal for a vehicle operator in viewing the vehicle operating information.

A head-up display system generally includes a display projection system, a collimator, and a combiner. The projection system includes a light source that projects operating information through the collimator which generally aligns the projected light rays. The collimated light is then reflected off the combiner, which is in the vehicle operator's field of view. In this manner, important vehicle information such as, for example, fuel information and vehicle speed is displayed within the operator's field of vision through the windshield and permits the operator to safely maintain eye contact with the real world while simultaneously viewing the displayed information. The reflected images of the display may be focused anywhere from a position immediately in front of the vehicle to optical infinity.

Laminated windshields have been used as the combiner in a head-up display system to reflect a primary display image as taught in U.S. Pat. No. 2,264,044 to Lee. However, it has been observed that a secondary image is reflected off the outer surface of the windshield. This secondary image is superimposed over but offset from the primary image and reduces the overall image clarity.

It would be advantageous to have a wedged interlayer for use in a windshield for a head-up display which windshield functions as a combiner and provides a clear display image without incorporating additional components on or within the windshield.

SUMMARY OF THE INVENTION

The present invention provides a shaped interlayer blank for use with glass in a vehicle windshield. The blank is a single layer formed of plasticized polyvinyl butyral and having a quadrilateral peripheral contour with two sides of arcuate shape and a wedge-shaped thickness profile extending from the edge of one arcuate side to the edge of the other arcuate side. The interlayer is used in a windshield for a head-up display system and because of the wedge shape reduces the amount of double imaging that occurs when a laminated windshield having the wedged shaped interlayed is used as the combined in the display system.

In one particular embodiment of the invention, the windshield includes a pair of glass plies secured to each other by a sheet of thermoplastic interlayer material tapered in thickness from one edge to its opposing edge. The tapered configuration of the interlayer may be achieved by casting the interlayer to the desired configuration or differentially stretching the interlayer to the desired shape. When the glass plies and tapered interlayer are assembled and laminated to form a unitary structure, the opposing major surfaces of the laminate are non-parallel and offset at a predetermined angle such that images from a display source that are reflected off the opposing major surfaces of the laminate are substantially superimposed over each other.

BRIEF DESCRIPTION OF THE DRAWINGS

(FIG. 5 corresponds to FIG. 1 of U.S. Pat. No. 4,554,713).

DETAILED DESCRIPTION OF THE INVENTION

The present invention relates to the elimination of double imaging in a head-up display system that uses an automotive windshield as the combiner but it should be appreciated that the present invention may be used in any type of combiner having a laminate construction where double imaging is to be eliminated.

Figure 1:
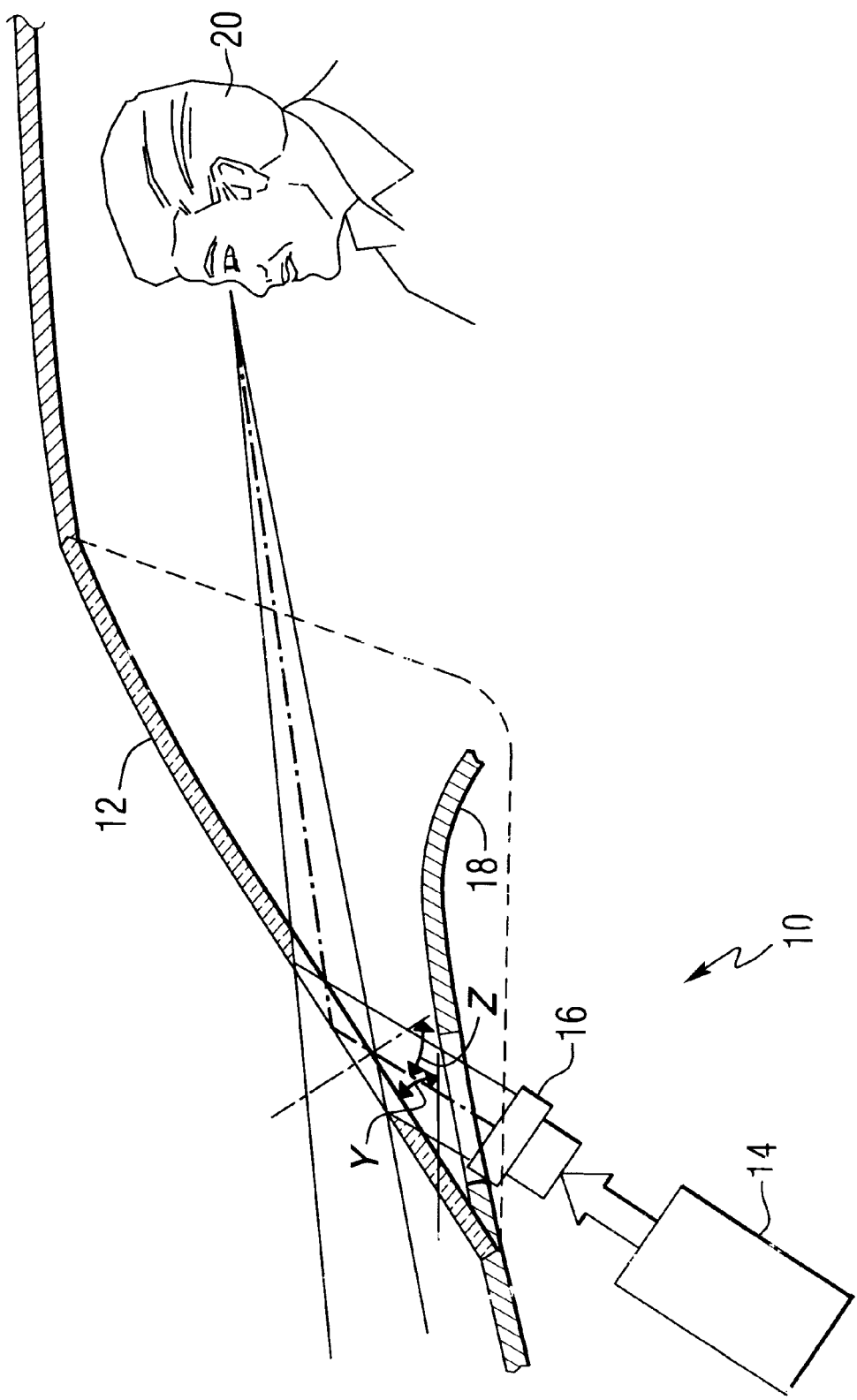
FIG. 1 is a schematic of head-up display system for a vehicle.

With reference to FIG. 1, head-up display 10 system includes a motor vehicle windshield 12, an image source 14 and a projection assembly 16, preferably mounted immediately beneath the upper surface of the vehicle dashboard 18 and positioned between the image source 14 and windshield 12. Light rays emanate from the image source 14 and are projected onto the windshield 12, which operates as a combiner as will be discussed later, and reflected into the field of vision of the vehicle operator 20. The light rays projected onto the windshield 12 are collimated so as to create a virtual image in front of the car, preferably at about 10 to 50 feet (3 to 15 meters) in front of the windshield 12.

Although not limiting in the present invention, the image source 14 preferably is a transmissive liquid crystal display (LED) that is adequately illuminated to project information carrying light rays through the projection assembly 16 onto the windshield 12 at a location within the vehicle operator's direct line of sight while permitting peripheral viewing of the outside real world as the operator 20 monitors the display. It is contemplated that alternative viewing locations will also provide an effective head-up display for vehicle windshield. The displayed image (not shown) may include numerical or graphical symbols including for example, vehicle speed, fuel level, engine RPMs, temperature, and warning symbols.

The following discussion will be directed towards the use of a prior art windshield as the combiner in a head-up display system which projects an image a finite distance in front of the windshield. In particular, referring to FIG. 2, windshield 30 represents a windshield assembly with the opposing inner and outer major surfaces of the windshield being parallel to each other. In particular, the windshield 30 includes outer glass ply 32 bonded to inner glass ply 34 by an interlayer material 36. Because the thickness of the interlayer 36 is fairly uniform and the opposing major surfaces of each glass ply are substantially parallel to each other, i.e. inner surface 37 of the ply 32 is parallel to its outer surface 38 and inner surface 39 of the ply 34 is parallel to its outer surface 40, the outer major surface 38 of the glass ply 32 is parallel to the outer major surface 40 of the glass ply 34 after the glass plies 32 and 34 and interlayer 36 are laminated together to form a unitary structure. Although not limiting in the present invention, for the purposes of illustration, surfaces 38 and 40 are assumed to be planar in the following discussion. However, the surfaces may be non-planar, as will be discussed later.

Figure 2:
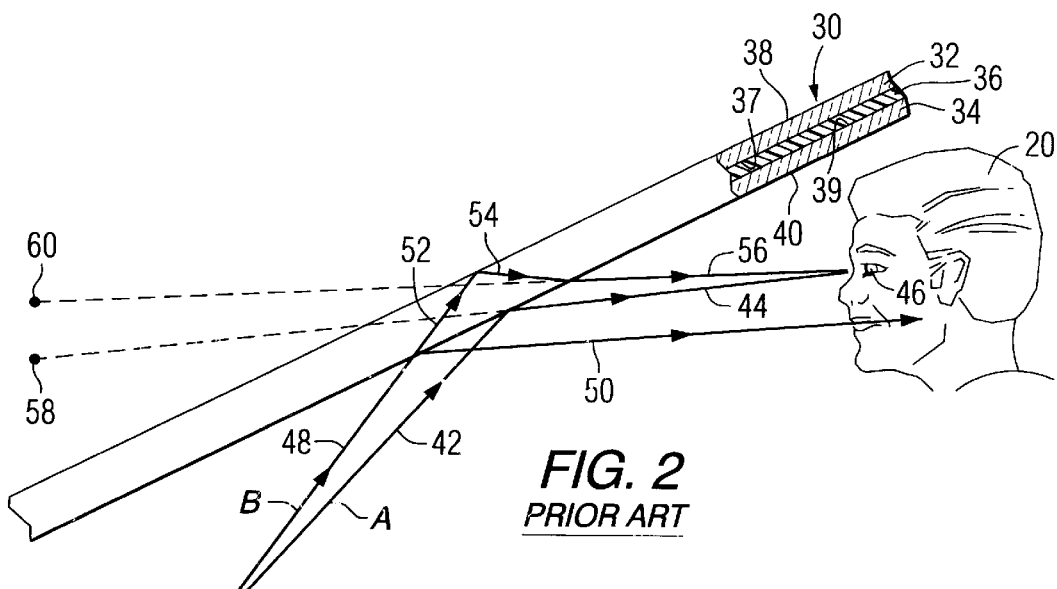
FIG. 2 is an enlarged, partial cross-sectional view of FIG. 1 illustrating a head-up display using a prior art windshield.

With continued reference to FIG. 2, a light ray A from image source 14 is directed along line 42 and a portion of the light is reflected off surface 40 of the ply 34 along line 44 to eye 46 of the vehicle operator 20. Additional light rays from the source 14 are directed along additional lines. For example ray B is directed along line 48 and reflected off the surface 40 along line 50. However, the ray B along line 50 is not directed to the eye 46 so it will not be detected by the observer 20. A portion of the light ray B which is directed along line 48 will enter the windshield assembly 30 and be refracted along line 52. The angular difference between the lines 48 and 52 depends on the angle of refraction as the light ray passes through the air and into the glass ply 34. The angle of refraction in turn depends, in part, on the angle at which ray B is incident on surface 40 and the relative densities of the air and the glass. The ray B passes through the windshield assembly 30 and a portion of the light ray B is reflected off surface 38 of the ply 32 along line 54. It is assumed that the refractive index of interlayer 36 is the same as that of the glass plies 32 and 34 so that the light rays are not distorted as they pass through the windshield assembly 30 along lines 52 and 54. A portion of the light ray B leaves the windshield assembly 30 at the surface 40 of the glass ply 34 where the direction of the light is again changed due to the difference in the refraction index between the windshield assembly 30 and the air, as discussed earlier, and directed along line 56 to eye 46. Because the light rays A and B received by the eye 46 from the image source 14 are along two different lines, i.e. lines 44 and 56, the observer 20 will perceive two offset images where in fact there is only one image source 14. The first image 58, or virtual image, is the image seen by the observer 20 from the light directed along line 44. The second image 60 is the image seen by the observer 20 from the light directed along line 56. When viewing both images, the virtual image 58 will appear brighter than the second image 60 because a greater portion of the light from the image source 14 which was initially directed along line 42 will be directed along line 44 as compared to the amount of light initially directed along line 48 and which is finally directed along line 56 to the observer 20. This condition of seeing two offset images is commonly referred to as double imaging, or ghost imaging, and results when the outer surfaces of the windshield assembly, i.e. surfaces 38 and 40 of windshield assembly 30, are parallel to each other.

In order to reduce the amount of double imaging in windshield assembly 30, the present invention modifies the windshield structure. Although not limiting in the present invention, referring to FIG. 3 which illustrates a preferred embodiment of the present invention, windshield 130 includes outer glass ply 132 bonded to inner glass ply 134 by an interlayer material e.g. a thermoplastic material 136 along inner major surfaces 137 and 139 of plies 132 and 134, respectively. The interlayer 136 is fabricated such that there is a gradual tapering of its thickness, i.e. the interlayer material gradually decreases in thickness from one edge to its opposing edge. As a result of this "wedged" shape of the interlayer, when the windshield components are assembled and laminated, outer major surface 138 of glass ply 132 and outer major surface 140 of glass ply 134 will be non-parallel. It has been found that by controlling the amount by which the glass plies 132 and 134 of the windshield 130 are offset from each other, the double imaging encountered when using a windshield as shown in FIG. 2 as a combiner can be reduced. The actual wedge angle X required to reduce the double imaging depends, in part, upon the thickness of the windshield, the windshield materials, and the relative positions and orientations of the image source 14, the windshield 130 and the vehicle operator 20. Although not limiting in the present invention, the interlayer 136 can be cast in place to provide the desired wedge angle X. As an alternative, the interlayer 136 can be differentially stretched in any convenient manner known in the art, such as that disclosed in U.S. Pat. No. 4,201,351 to Tolliver and U.S. Pat. No. 4,554,713 to Chabel, which teachings are incorporated herein by reference.

More particularly, in the preparation of laminated safety glass for one piece windshields of modern automobiles, a thermoplastic sheet is placed between two curved glass sheets of matching configuration. The two glass sheets are bonded to the opposite sides of the plastic sheet by heat and pressure to form the laminated windshield.

The laminated windshields often have an upper colored portion that reduces glare. This coloration in the thermoplastic interlayer sheet is a colored band which is preferably graduated in intensity with the intensity of coloration decreasing from the top of the windshield so that the line of demarcation between the colored band and the uncolored portion of the interlayer is above the direct line of vision. (Column 1, lines 18–31, of U.S. Pat. No. 4,554,713.)

Figure 5:
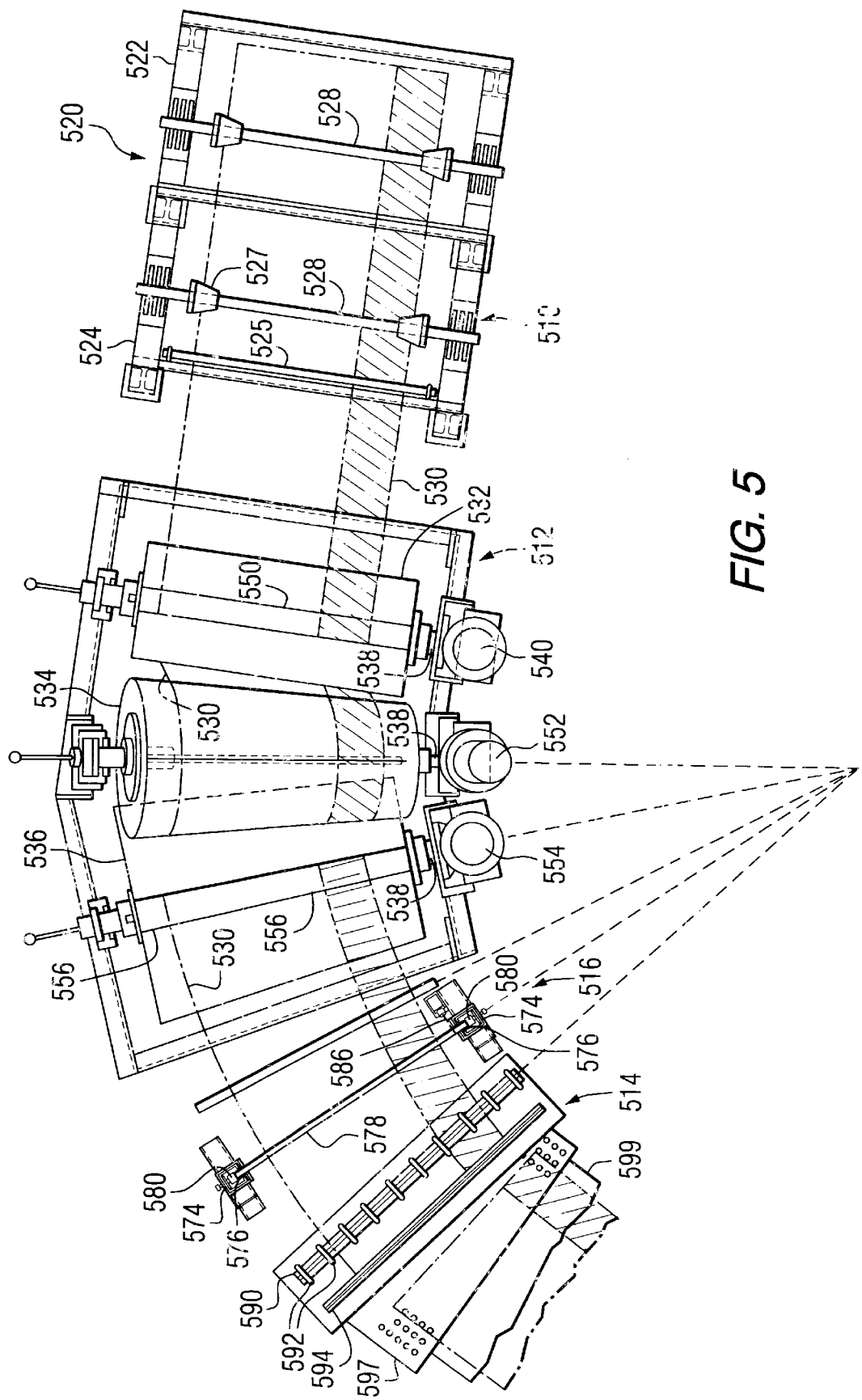
FIG. 5 is a plan view showing differential web stretching.

Referring to FIG. 5, there is shown the web stretching apparatus of U.S. Pat. No. 4,554,713 that causes a continuous web of plastic interlayer material to develop arcuate side edges and an alignment device. (Condensed from Col. 5, lines 7–21, of U.S. Pat. No. 4,554,713.)

The apparatus includes a loading station 510 and a differential web stretcher 512 in end to end relation along a path of movement for a thin elongated, continuous, flexible web of interlayer material such as polyvinyl butyral plasticized with a suitable plasticizer and sold by DuPont under the trademark Butacite® B-140 or a similar product sold by Monsanto under the trademark Saflex™ TL. A web cutting machine 514 is located in spaced relation to the downstream end of the differential web stretcher 512. A web alignment device 516 is interposed in a preferred position of orientation across the path of movement of a differentially stretched web between the downstream end of the differential web stretcher 512 and the upstream end of the web cutting machine 514. (Condensed from Column 5, lines 22–41, of U.S. Pat. No. 4,554,713).

The loading station 510 includes a frame structure 520 comprising upstream lower support beams 522 and downstream upper support beams 524 and a pair of guide rolls 525 supported near the downstream end of the loading station 510. Roll 527 mounted on spindle 528 is composed of a continuous web 530 of interlayer material. Web 530 extends downstream from the supply roll 527 through the guide roll 525 toward and into the differential web stretcher 512. (Condensed from Column 5, lines 42–58, of U.S. Pat. No. 4,554,713.)

The differential web stretcher 512 comprises a cylindrical heating roll 532 mounted for rotation about an axis extending in a given plane obliquely downstream of a path of web movement, a first frustoconical roll 534 that is heated and a second frustoconical roll 536 that is cooled. The first frustoconical roll 534 is mounted on an axis in a plane transversely oblique to said path and overlaps rolls 532 and 536. Both of the latter are preferably mounted on horizontally extending axes of rotation for convenience, although any pair of axes in a common plane would be suitable. The rolls 532 and 534 are rotatably mounted so that the angle between the axis of cylindrical roll 532 and the axis of first frustoconical roll 534 is equal to the included angle of the cone of which the roll 534 is a frustum. Rolls 532 and 534 are mounted so that the distance between them at the smaller end of frustoconical roll 534 is not much greater than the thickness of web 530. (Condensed from Column 6, lines 1–24, of U.S. Pat. No. 4,554,713.)

The second frustoconical roll 536 is rotatably mounted with respect to the first frustoconical roll 534 so that at both ends of these rolls the distance between them is approximately one inch (2.5 cm). Frustoconical rolls 534 and 536 have the same included angle and each has an apex at the same point as the apex of the other frustoconical cone. (Condensed from Column 6, lines 25–39, of U.S. Pat. No. 4,554,713.)

The first frustoconical roll 534 has a larger diameter at its wider end than that of cylindrical roll 532. The second frustoconical roll 536 is larger in diameter than the first frustoconical roll 534. (Condensed from Column 6, lines 40–43, of U.S. Pat. No. 4,554,713.)

Cylindrical heating roll 532 is rotatably driven through its stub shaft 538 by a motor 540 at one axial end. A cylindrical tension roll 550 is loaded either by a tension spring or a hydraulic means to rotate by friction against the outer surface of the cylindrical heating roll 532. (Condensed from Column 6, lines 44–54, of U.S. Pat. No. 4,554,713.)

Downstream of the cylindrical heating roll 532, the first frustoconical roll 534 is driven by a second motor 552 through a stub shaft 538 at the axial end corresponding to the driven end of cylindrical heating roll 532 at a minimum peripheral speed equal to that of the roll 532. The other end of the first frustoconical roll 534 is supported in a similar manner to the corresponding end of the cylindrical roll 532 and is provided with similar inlet and outlet pipes for supplying and removing hot liquid into the interior of the first frustoconical roll 534. The taper of the first frustoconical roll 534 is selected to provide a differential stretching of each incremental length of web that forms a relatively small diameter curvature for the portion of the web containing the colored band that passes around the narrow end portion of the frustoconical roll 534 of desired size and a larger diameter curvature for the opposite side of the web portion containing the clear area that passes around the wider portion of the first frustoconical roll 534. (Condensed from Column 7, lines 12–30, of U.S. Pat. No. 4,554,713.)

Downstream of the first frustoconical roll 534 is the second frustoconical roll 536 of the same taper approximately as that of roll 534. The roll 536 is driven by a third motor 554 through a stub shaft 538 at the end corresponding to the driven ends of rolls 532 and 534 and also supported at its opposite end in a similar manner to the manner of support for the other rolls 532 and 534. (Condensed from Column 7, lines 31–60, of U.S. Pat. No. 4,554,713.)

In order to maintain proper entry of the arcuately shaped length of web 530 into the web cutting machine that operates intermittently, the web alignment device 516 is mounted between the differential web stretcher 512 and the web cutting machine 514 and to replace the cylindrical drive roll of the commercially available web cutting machine with a tapered drive roll 590. For best results, the taper of the drive roll 590 for the web cutting machine should approximate the taper common to the frustoconical rolls 534 and 536 and the tapered tension rolls 556 and 558. However, adequate results ensue when the taper of the driving roll for the web cutting machine is slightly shallower than the taper of the tapered rolls 534, 536, 556 and 558 of the continuous stretching machine, provided a self-aligning device of the present invention is included in proper position to intercept the arcuate path of movement of the differentially stretched web. (Condensed from Column 8, lines 37–55, of U.S. Pat. No. 4,554,713.)

The web aligning device 516 comprises an H-shaped base comprising a cross beam interconnecting a pair of end beams. Each end beam supports the bottom of a vertical guide post 574. Each of the latter is provided with a member having an interior vertical slot 576. A floating rod 578 is provided with a caster 580 at each end to permit the floating rod 578 to ride along the vertical slots 576 with the vertical guide posts 574 controlling the axial movement of the ends of the rod 578. The web aligning device 516 is preferably oriented so that a vertical plane common to the slots 576 extends normal to the tangents to the opposite sides of an arcuate path taken by the differentially stretched web 530 passing under the rods 578 when the web is properly aligned and oriented. This arrangement controls the floating movement of rod 578 in a vertical plane that is normal to the tangents of the arcuate side edges of the differentially stretched web. (Condensed from Column 8, line 67, through Column 9, lines 24, of U.S. Pat. No. 4,554,713.)

The continuous web 530 is mounted under the floating rod 578 between the differential web stretcher 512 and the web cutting machine 514. The differentially stretched web 530 has its leading edge portion at the web cutting station 514 clamped to the drive roll 590 with a very short length beyond the drive roll 590. (Condensed from Column 9, lines 48–53, of U.S. Pat. No. 4,554,713.)

The modified web cutting station 514 comprises a tapered drive roll 590 having a taper either approximately of slightly less than the taper common to frustoconical rolls 534 and 536. Roll 590 is driven intermittently when limit switch 586 is actuated for a period determined by an electronic timer through a tapered drive roll actuating motor (not shown). A plurality of axially spaced hold down rolls 592 is biased to engage the web 530 against the upper surface of the tapered drive roll 590. A cutting device immediately downstream of the tapered drive roll 590 comprises a cutting blade 594 actuated by cam means and a cutting block. The cutting blade extends parallel to the vertical tangential plane of said tapered drive roll 590 and is actuated to slice across the web 530 after the loop of the web has moved for a predetermined time through the nip between the tapered drive roll 590 and the hold down rolls 592. The cutting blade may be mounted either above or below the cutting block and moves through the thickness of web 530 to cut the latter. (Condensed from Column 9, line 54, through Column 10, line 5, of U.S. Pat. No. 4,554,713.)

A slanted table 597 has an upper apertured top slanted downwardly in a downstream direction from the web cutting machine 514 to permit the cut lengths of flexible interlayer material to slide out of the way of the cutting knife 594. A collection table 599 is provided near the lower end of slanted table 597. (Condensed from Column 10, lines 6–11, of U.S. Pat. No. 4,554,713.)

Figure 3:
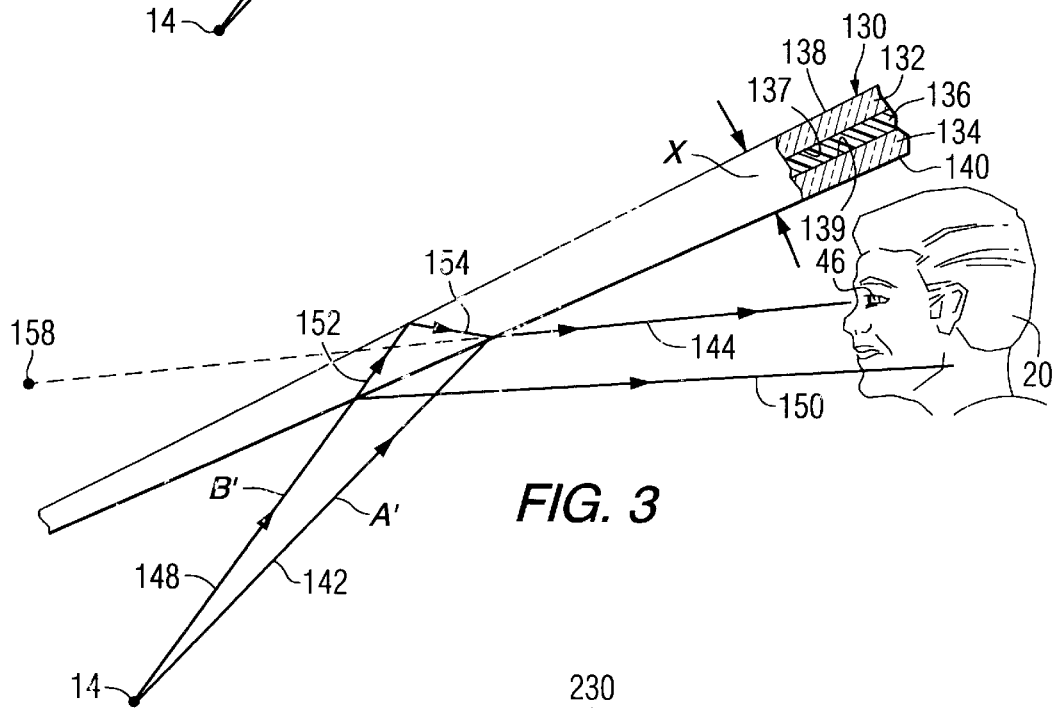
FIG. 3 is an enlarged, partial cross-sectional view of FIG. 1 illustrating a head-up display using a windshield incorporating features of the present invention.

With continued reference to FIG. 3, light ray $A^1$ from image source 14 is directed along line 142 and reflected off surface 140 along line 140 to the observer's eye 46. Additional light ray $B^1$ is directed along line 148 and, as discussed earlier, a portion of the light ray is reflected from the surface 140 along line 150 such that it is not seen by the observer 20. The remaining portions of the ray $B^1$ are refracted through the glass plies 132 and 134 and the interlayer 136 along line 152, in a manner similar to that discussed earlier, reflected off the surface 138 of the glass ply 132 along line 154, and refracted as it leaves the assembly 130 to the observer's eye 46. However, unlike the windshield assembly 30 in FIG. 2 wherein the line 56 from ray B is along a different orientation than line 44 from ray A, in FIG. 3 the wedge angle X is such that the refracted light from light ray $B^1$ exits the assembly 130 along the line 144, i.e. superimposed over the light from ray $A^1$ reflected off the surface 140 of the glass ply 134. As a result, the image viewed by the observer 20 resulting from light rays $A^1$ and $B^1$ are superimposed over each other so that there is only a single image 158.

It should be appreciated that in a windshield assembly, the surfaces 138 and 140 of the glass plies 132 and 134, respectively, are often not planar but rather have a curved configuration. However, the amount of relative curvature in the windshield assembly 130 within the small area used as the combiner is relatively small so that the area within the combiner portion of the windshield 130 is nearly planar. Furthermore, if required due to excessive curvature of the windshield within the combiner area, the image from the image source 18 can be distorted, for example by incorporating additional lens arrangements (not shown) into the projection assembly 16 (shown only in FIG. 1) to account for the curvature of the windshield surfaces.

In one particular embodiment of the invention, the windshield 130 includes 0.090 inch (2.3 mm) thick glass plies and two polyvinyl butyral interlayer plies. Each interlayer ply is originally 0.020 inches (0.05 mm) thick and is differentially stretched so that each interlayer ply has a taper of approximately 0.003 inches (0.076 mm) over a 36 inch (91 cm) interlayer width for a combined thickness differential of approximately 0.006 inches (0.152 mm) from top to bottom when incorporated into windshield 130. Referring to FIG. 1, it has been observed that a windshield of this construction, mounted in a vehicle at an installation angle Y of approximately 30° with an angle of incidence Z between the windshield 12 and the light ray from the image source 14 of approximately 65° significantly reduces the amount of ghost imaging in a head-up display system as compared to a conventional windshield having a non-wedged configuration.

Figure 4:
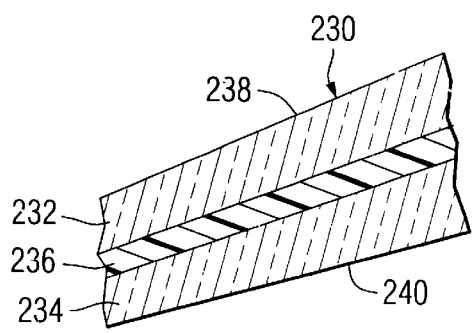
FIG. 4 is an exploded cross-sectional view of an alternate embodiment of the invention.

Although the windshield configuration 130 of the present invention as shown in FIG. 3 includes two glass sheets each having generally parallel opposing major surfaces and a tapered interlayer ply, based on the teachings of this disclosure, it is obvious to one skilled in the art that other windshield configurations can be used to provide a wedged windshield configuration similar to that shown in FIG. 3. In particular, referring to FIG. 4, one or both of the glass plies 232 and 234 may be provided with a taper such that when the assembly 230 is laminated to form a unitary structure using a non-stretched interlayer 236, opposing surfaces 238 and 240 of the windshield 230 are non-parallel and are oriented relative to each other so as to eliminate the ghost imaging. It is further contemplated that one or more tapered interlayer may be used in combination with one or more tapered glass plies so that the final laminated assembly provides the windshield construction having the configuration required to reduce double imaging.

The forms of this invention shown and described in this disclosure represent illustrative preferred embodiments and various modifications thereof. It is understood that various changes may be made without departing from the scope of the invention as defined by the claimed subject matter which follows.

I claim:

1. A laminate comprising:
   a first sheet capable of passing visible light having a first surface and an opposite surface defined as a second surface;
   a second sheet capable of passing visible light having a first surface and an opposite surface defined as a second surface;
   an interlayer capable of passing visible light between the second surface of the first sheet and the first surface of the second sheet and securing the sheets together to form the laminate, and
   one of the sheets has a wedged shaped thickness to provide the laminate with a wedge-shaped thickness profile.

2. The laminate of claim 1 further including the interlayer having a wedge-shaped thickness profile.

3. The laminate of claim 1 wherein both sheets have a wedge-shaped thickness profile.

4. The laminate of claim 1 wherein the sheets are transparent sheets.

5. The laminate of claim 4 wherein the laminate is an automotive transparency.

6. The laminate of claim 5 wherein the sheets are glass sheets.

7. The laminate of claim 6 wherein the laminate is an automotive windshield.

8. The laminate of claim 7 wherein the interlayer is polyvinylbutyral.

9. The laminate of claim 8 wherein the interlayer is a plasticized polyvinylbutyral.

10. The laminate of claim 9 wherein the interlayer has a gradient color band adjacent an edge of the interlayer.

11. The laminate of claim 10 wherein the windshield has arcuate opposed edges with the color band at the greater thickness region of the laminate and the color band is substantially parallel to an arcuate edge of the laminate.

12. The laminate of claim 7 wherein the interlayer includes two layers.

13. The laminate of claim 1 wherein the laminate is an automotive windshield, the interlayer is plasticized polyvinylbutyral, the interlayer is adhered to the second surface of the first sheet and the first surface of the second sheet and the first and second sheets are glass sheets each having a wedge-shaped thickness profile further including the windshield having two edges that are arcuate shaped with one of the arcuate shaped edges being of greater thickness and having an arcuate gradient color band.

* * * * *